Dec. 25, 1956  J. A. GENDREAU ET AL  2,775,474
SANDER ATTACHMENT FOR MOTOR VEHICLES
Filed May 21, 1952  2 Sheets-Sheet 1
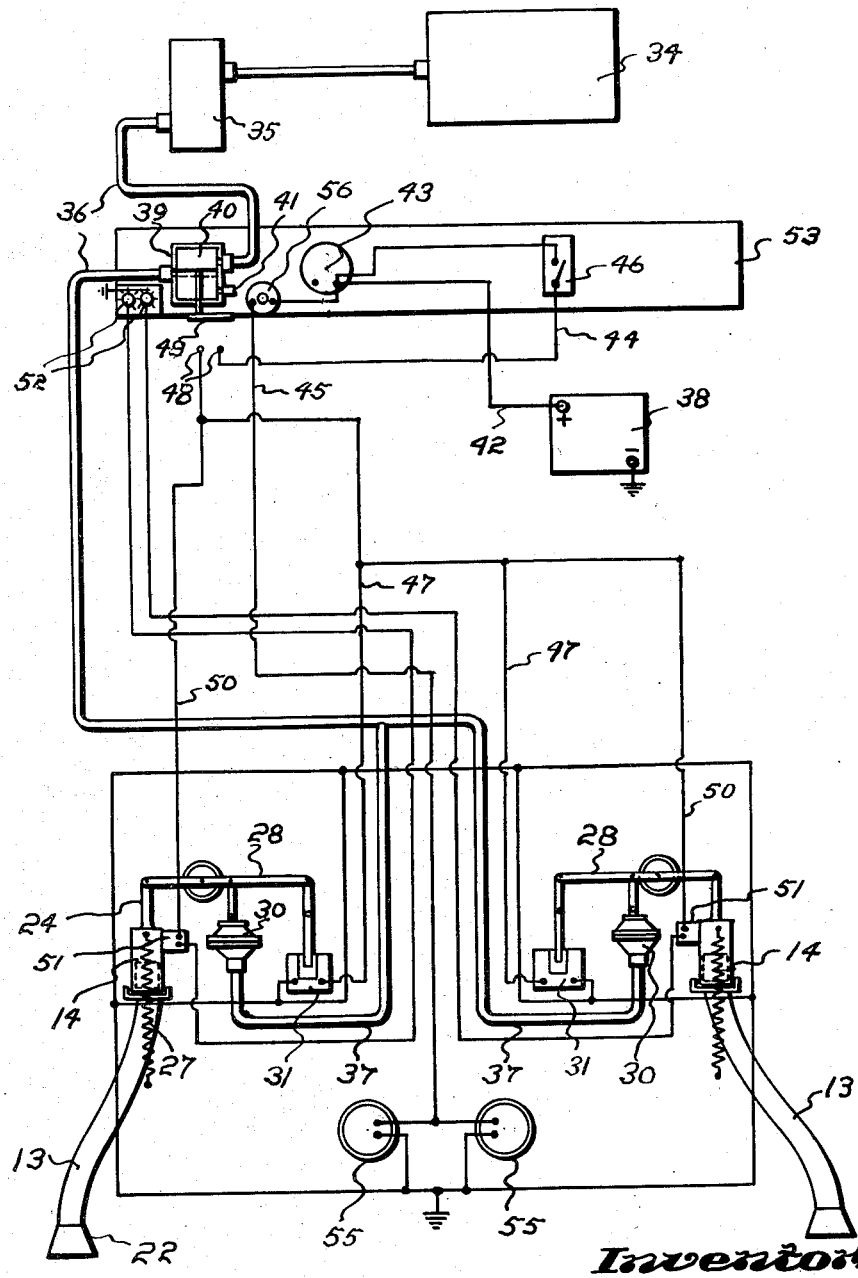

Dec. 25, 1956  J. A. GENDREAU ET AL  2,775,474
SANDER ATTACHMENT FOR MOTOR VEHICLES
Filed May 21, 1952  2 Sheets-Sheet 2
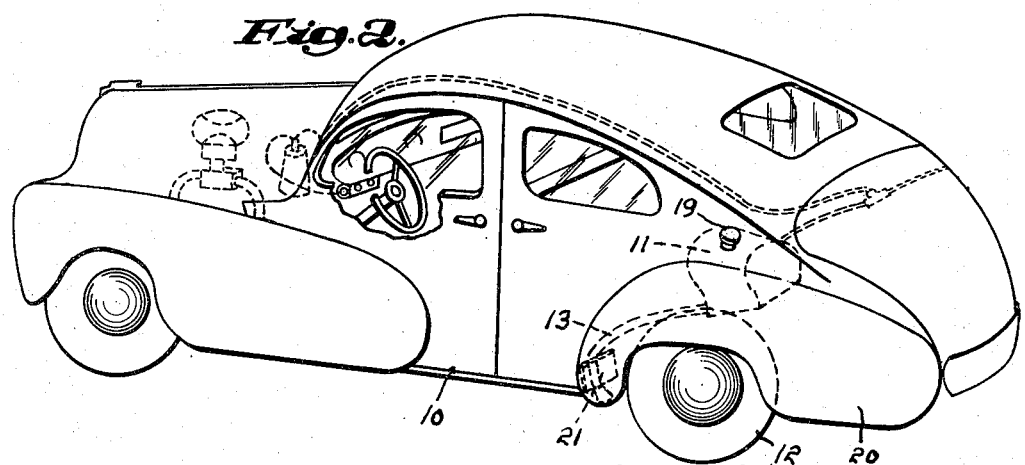
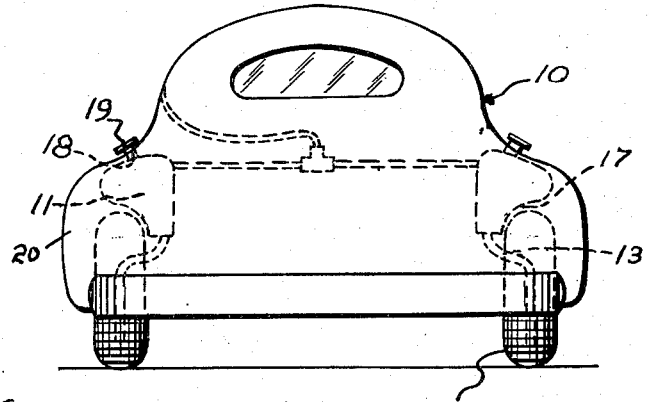
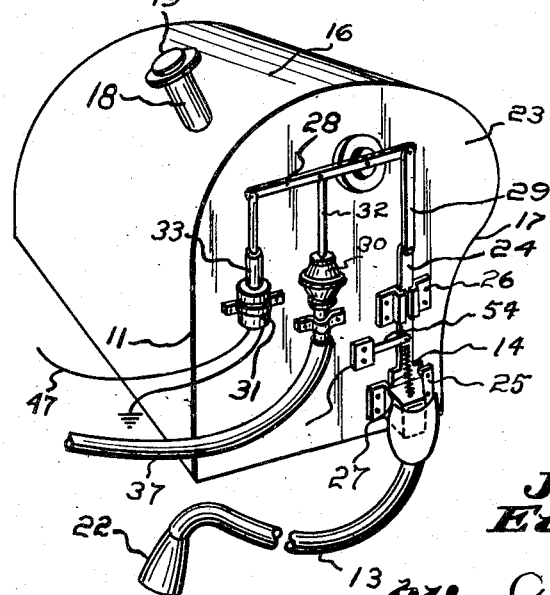
Inventors:
Joseph A. Gendreau,
Evariste Domingue,
Joseph Fuller,
by Abbott Spear Attorney

United States Patent Office 2,775,474
Patented Dec. 25, 1956

2,775,474

SANDER ATTACHMENT FOR MOTOR VEHICLES

Joseph A. Gendreau and Joseph Fuller, Fall River, Mass., and Evariste Domingue, Auburn, Maine Application May 21, 1952, Serial No. 289,166

4 Claims. (Cl. 291—23)

Our present invention relates to sand delivery means for use in delivering sand to the path of the driving wheels of a motor vehicle thereby to enable it to be driven safely when slippery roads prevail.

Many attempts have been made to provide means for accomplishing this result. These have been objectionable because of the space required for their installation, particularly in passenger vehicles and because their operation was not positively ensured.

In accordance with out invention we provide a sand source having an outlet disposed in desired relation to the path of each driving wheel with each outlet being under the control of a normally closed gate. Each gate is under the control of a pair of power operated elements each of which is connected to a different power source. In practice, one of the elements in control of each gate is operated by electricity and the other of those elements is actuated by intake pressures and we provide a common operator control for all the gate opening elements thereby ensuring against the failure of the gates to open on the failure of either source of element operating power.

In the accompanying drawings, we have shown an embodiment of our invention to illustrate a preferred tank, gate, and outlet assembly by which minimum space for installation is required and failure of said delivery is effectively minimized. We have also shown a control system for the gates ensuring their operation even if one of the power sources is not operative.

In the drawings:

Fig. 1 is a schematic view of the gate controlled sand outlets and the control system therefor.

Fig. 2 is a fragmentary view, in perspective, of a motor vehicle equipped in accordance with our invention.

Fig. 3 is a rear view of the vehicle shown in Fig. 2, and

Fig. 4 is an enlarged view, in perspective, of the tank, outlet and gate and the gate opening means.

In accordance with our invention, we provide a motor vehicle 10 with a source of sand in the form of tanks 11. In practice, we provide a separate tank for each of the driving wheels 12 and each of these has an outlet 13 disposed to discharge sand in the path of the wheels 12 and controlled by the normally closed gate 14.

In Figs. 2–4, we have shown a preferred form of the tanks 11 mounted, for example, in the trunk 15 of the vehicle 10 at the sides thereof so that they may be easily installed and interfere to a minimum extent, with normal use of that compartment. While the shape of the tanks 11 depends to a considerable degree on the style and construction of the vehicle body, we have shown the tanks 11 as having curved tops 16 and their outer wall as having a concavity 17 so that each may be located closely adjacent the upper part of a wheel 12 with its filler tube 18 extending through the vehicle body and closed by a cap 19.

In practice, the outlet 13 is of flexible tubing and is disposed to extend forwardly and downwardly along the under surface of the front part of the rear fender 20 where it is confined by a protective shield 21. The discharge nozzle 22 of the outlet 13 is preferably also formed from flexible stock. For this purpose, copper tubing is used and its smooth interior reduces the possibility of clogging.

As stated, the outlets 13 extend forwardly from the front face 23 of the tanks closely adjacent the bottom thereof. The gate 14 of each tank 11 includes a stem 24 and the gate 14 and stem 24 are slidably confined by brackets 25 and 26, respectively. A spring 27 anchored to the stem 24 and to the bracket 25 of each tank serves to yieldably maintain the gates 14 normally in a closed position.

Pivoted to each of the tank faces 23 is a lever 28 connected to the stem 24 of the gate of that tank by means of a link 29. Adjacent the other end of the lever 28, we mount a diaphragm unit 30 and an electromagnet 31. The unit 30 has its piston 32 suitably connected to the lever 28 so that when actuated it will be operative to pivot the lever 28 to open the gate 14 and the plunger 33 of the electro-magnet 31 is likewise connected to the lever 28 so that, when energized, it will also function to pivot the lever 28 thereby to raise the gate 14. Because it is desirable to use an electro-magnet of a type which will represent, when energized, an insignificant drain on the storage battery, it is desirable to have it connected to the lever 28 to have maximum leverage whereas the diaphragm unit 30, which is pressure operated as by intake pressures, has adequate power to effect gate opening even though it is connected to the lever 28 closely adjacent the pivot point thereof.

In Fig. 1, we have suggested at 34 a motor vehicle engine and at 35 a suction tank connected to the intake manifold thereof to establish a source of power to operate the diaphragm units 30 through the line 36, preferably of flexible stock so that it may be easily unslotted and concealed. The line 36 includes a branch 37 to each of the units 30. We have also indicated a storage battery at 38 to supply operating current to the electro-magnets 31. While the operation of the units 30 and the electro-magnets 31 may be separately effected, we prefer that they be operated by a common control, ensuring opening of the gates 14 even if either one of the two sources of power has failed.

We have indicated such a control, in Fig. 1, as consisting of a valve body 39 having a valve element 40 shown as blocking the line 36 from the tank 35 while effecting communication between the branch line 37 from the units 30 and the vent 41. When the valve element 40 is in its operative position, the vent 41 is blocked and the line 36 effects communication between the tank 35 and the units 30.

Electricity is supplied to the electro-magnets 31 from the storage battery 38 having a lead 42 therefrom to the ammeter 43. We employ circuits 44 and 45 with the circuit 44 being controlled by the switch 46 which may be the ignition switch. The circuit 44 includes parallel leads 47 to the electro-magnets 31.

In order that the circuits 44 may be closed and opened simultaneously with the movement of the valve element 40 into its operative and inoperative positions, we have shown the circuit 44 as having a pair of spaced switch contacts 48 with a circuit completing switch element 49 connected to the valve element 40 and engageable with the contacts 48 when it is operatively positioned.

The circuit 44 also includes parallel leads 50, each of which includes a switch 51 and a signal light 52, shown as located on the instrument panel 53. Each of the switches 51, as shown in Fig. 4, has an operating arm 54 connected to a gate stem 24 so that when that gate is closed, its switch 51 is open and is closed when that gate is open thereby to show the operator that sand is being delivered to the path of the driving wheels of his vehicle.

In practice, it is, of course, important to know when the supply of sand is exhausted and for that reason I have indicated at 55 an indicator for each of the tanks 11. The indicator 55 may be of any desired type such as a switch in the circuit 45 held open by any appreciable weight of sand but spring operated to close when the sand supply is substantially exhausted, thereby to close the circuit to the warning light 56 on the instrument panel 53.

It will thus be apparent that a device in accordance with my invention is of simple and rugged construction, reliable in its operation, and includes means enabling the operation of a motor vehicle equipped with it, to drive with relative ease and safety when the highways are slippery.

What I therefore claim and desire to secure by Letters Patent is:

1. A control system for use in the delivery of sand to the path of the driving wheels of a motor vehicle having a source of electricity, said system comprising a source of sand and an outlet therefrom disposed in desired relation to each of said wheels, a gate for each outlet yieldably held in a closed position, a pair of power operated elements connected to each gate to open it, one of said elements including a connection to said source of electricity and the other of said elements including connections to the vehicle motor to be actuated by pressures developed by its operation, and a common operator control for all of said connections whereby the opening of the gates is ensured in the event of failure of operation of either element.

2. A control system for use in the delivery of sand to the path of the driving wheels of a motor vehicle having a source of electricity, said system comprising a source of sand and an outlet therefrom disposed in desired relation to each of said wheels, a gate for each outlet yieldably held in a closed position, a pressure operated element and a solenoid connected to each gate to open it when actuated, a circuit from said source of electricity in which each of said solenoids are in parallel and which includes a switch, a conduit including branch lines to each of said pressure operated elements and including a valve, said conduit being connected to the vehicle motor to be actuated by pressures developed by its operation, and a common operator control for said switch and said valve.

3. A control system for use in the delivery of sand to the path of the driving wheels of a motor vehicle having a source of electricity, said system comprising a source of sand and an outlet therefrom disposed in desired relation to each of said wheels, a gate for each outlet yieldably held in a closed position, a pressure operated element and a solenoid connected to each gate to open it when actuated, a circuit from said source of electricity in which each of said solenoids are in parallel and which includes a switch, a conduit including branch lines to each of said pressure operated elements and including a valve, said conduit being connected to the vehicle motor to be actuated by pressures developed by its operation, a common operator control for said switch and said valve, and a circuit for each gate, said circuit including said source of electricity, a normally open switch closed by the opening of said gate, and a signal light.

4. A sand tank to be mounted in a motor vehicle to discharge sand in the path of its driving wheels, said tank having an outlet, a slidable gate for said outlet carried by said tank, a lever pivotally connected to said tank, yieldable means normally holding said gate closed, and a diaphragm unit and a solenoid carried by said tank and operatively connected to said lever so that when either is actuated a connection is raised between said lever and said gate, said diaphragm unit being disposed relatively close to the pivot point of said lever and said solenoid being disposed relatively remote therefrom.

References Cited in the file of this patent

UNITED STATES PATENTS

| | | |
|---|---|---|
| 1,117,894 | Orbin | Nov. 17, 1914 |
| 1,812,521 | Elston | June 30, 1931 |
| 2,031,009 | Sillcox | Feb. 18, 1936 |
| 2,131,514 | Johnson et al. | Sept. 27, 1938 |
| 2,137,917 | Lintern | Nov. 22, 1938 |
| 2,221,777 | Chapman | Nov. 19, 1940 |
| 2,604,613 | Klass | July 22, 1952 |
| 2,678,177 | Chenery et al. | May 11, 1954 |